US012701395B1

(12) United States Patent
Schumaier et al.

(10) Patent No.: US 12,701,395 B1
(45) Date of Patent: Aug. 4, 2026

(54) SYSTEM FOR DELIVERY OF DISASTER WARNINGS VIA SATELLITE

(71) Applicant: Daniel R. Schumaier, Elizabethton, TN (US)

(72) Inventors: Daniel R. Schumaier, Elizabethton, TN (US); Shawn Stahmer, Erwin, TN (US); Seth Elkins, Johnson City, TN (US); Richard Trent, Jonesborough, TN (US)

(73) Assignee: Daniel Schumaier, Elizabethton, TN (US)

( * ) Notice: Subject to any disclaimer, the term of this patent is extended or adjusted under 35 U.S.C. 154(b) by 0 days.

(21) Appl. No.: 19/561,819

(22) Filed: Mar. 10, 2026

Related U.S. Application Data

(63) Continuation-in-part of application No. 19/385,251, filed on Nov. 11, 2025, now Pat. No. 12,610,223.

(60) Provisional application No. 63/852,212, filed on Jul. 28, 2025.

(51) Int. Cl.
| *H04W 4/14* | (2009.01) |
| *H04W 4/90* | (2018.01) |
| *H04W 64/00* | (2009.01) |

(52) U.S. Cl.
CPC ............... *H04W 4/90* (2018.02); *H04W 4/14* (2013.01); *H04W 64/00* (2013.01)

(58) Field of Classification Search
CPC ................................... H04W 4/90; H04B 7/18
See application file for complete search history.

(56) References Cited

U.S. PATENT DOCUMENTS

| 10,580,287 B2 * | 3/2020 | Vallaire ................ G08B 27/008 |
| 2023/0122365 A1 * | 4/2023 | Sipra .................. H04B 7/18563 |
| | | 455/427 |
| 2026/0018042 A1 * | 1/2026 | Brooks ................ G08B 25/007 |

* cited by examiner

*Primary Examiner* — Michael T Vu
(74) *Attorney, Agent, or Firm* — Luedeka Neely, P.C.; Mark P. Crockett

(57) ABSTRACT

An emergency warning system is in communication with a global satellite network comprising individual satellites, each operable to transmit downlink signals extending over a downlink footprint. The system includes one or more server computers that receive an alert signal from an alerting system, determine the location of an emergency situation, identify a satellite in the network having a downlink footprint overlapping the location of the emergency situation, and generate alert information to be uplinked to the identified satellite. Disposed in the downlink footprint of the identified satellite is a disaster warning device that includes a satellite receiver that receives the alert information downlinked from the identified satellite. A controller in the disaster warning device processes the alert information to generate an alert message. An audio output transducer in the disaster warning device generates an audible warning based on the alert message.

20 Claims, 3 Drawing Sheets

SYSTEM FOR DELIVERY OF DISASTER WARNINGS VIA SATELLITE

BACKGROUND

Conventional disaster/weather alert systems use ground-based communications to deliver warning messages to the public. For example, emergency weather alerts in the U.S. are primarily delivered to mobile phones via Wireless Emergency Alerts (WEA), a system that uses participating wireless carriers to broadcast alerts from cell towers to compatible devices in affected areas. These alerts, which are authorized by government agencies like the National Weather Service (NWS) and the National Oceanic and Atmospheric Administration (NOAA), are sent through the Federal Emergency Management Agency's (FEMA) Integrated Public Alert and Warning System (IPAWS). WEA messages are limited to 90 characters and include the type of alert, the time it was issued, recommended actions, and the issuing agency. Alerts are triggered by specific NWS warnings, like Tornado Warnings, Hurricane Warnings, Amber alerts, etc.

Problems: The WEA system has gaps in its coverage where signals from the cell towers cannot be received by mobile devices due to terrain or other issues. For example, WEA coverage gaps may occur in deep valleys where some rivers and streams are prone to flash flooding. In such locations, a flash flood may cause a disastrous situation if homeowners or campers in the flood-prone area cannot receive the WEA alerts transmitted from cell towers.

Other problems with the U.S. weather alert systems include alert fatigue from excessive or false warnings, technical and staffing issues at the National Weather Service (NWS), and challenges in ensuring messages reach everyone effectively.

Alert Fatigue and Public Response: Frequent, sometimes non-urgent, warnings or false alarms cause people to tune out or disable alerts altogether, thereby increasing vulnerability during actual emergencies (known as the "cry wolf effect"). The current system often issues broad warnings, which can be ignored if the immediate danger isn't apparent to the recipient.

Inconsistent Message Delivery: The system is a patchwork of different platforms (cell phones, TV/radio, sirens, social media) with varying effectiveness. Rural areas, in particular, may lack adequate cell service or the infrastructure for sirens. Power and network outages during a fastmoving disaster can also prevent alerts from getting through.

Funding and Staffing Issues: The National Weather Service and NOAA have faced staffing shortages for years, including a lack of personnel to repair critical equipment like Doppler radars and observation stations, which can lead to prolonged outages and less accurate local data. Some local emergency management officials lack the funding, expertise, or authority to push out their own specific, timely alerts.

Technical and Human Errors: Human errors, such as a state worker in Florida checking the wrong box and sending an early morning alert to cell phones statewide as a test, erode public trust. Technical difficulties with NWS webpages and other systems have also been reported.

Outdated Technology and Data Gaps: The U.S. system has been criticized for not keeping pace with technological advancements. For example, a lack of stream gauges on the vast majority of U.S. waterways means flood risk is often assessed via less precise computer modeling, potentially resulting in unheeded or late flash flood warnings.

Federal officials and researchers are working on improvements, such as the FCC developing options for muted or vibrate-only alerts for less dire situations (set to go into effect in 2028), but these changes have been slow to implement.

More people do not use NOAA Weather Radio (NWR) due to the rise of convenient smartphone alerts, a lack of public awareness, potential reception issues, and occasional maintenance problems. Key factors include:

Smartphone Popularity: Most people now rely on their smartphones for weather alerts, which provide convenient push notifications and detailed, user-friendly information via weather apps or the Wireless Emergency Alert (WEA) system.

Lack of Awareness: Many people are simply not aware that NWR is the official source of government warnings or where these warnings originate, and thus do not appreciate the value of having a dedicated radio. Public service campaigns encouraging their use are limited.

Perceived Obsolescence: The dedicated weather radios are often seen as an outdated technology compared to modern, multi-function smart devices, even though radios offer vital reliability during power outages or cell service disruptions.

Reception Limitations: NWR signals, operating on low-power VHF frequencies, can be affected by distance from the transmitter, building construction, or local electrical interference, leading to poor reception in some areas. Not all parts of the U.S. have adequate coverage.

Setup Complexity: Programming Specific Area Message Encoding (SAME) codes for specific counties can be a tedious and confusing process for some users.

Maintenance and Reliability Concerns: While generally reliable, NWR transmitters can experience outages for maintenance, technical difficulties, or due to damage (e.g., lightning strikes), which can erode public trust if not communicated effectively.

Audio Quality: The automated, synthesized voices used for broadcasts can have a low sound quality and sometimes mispronounce words or place names, which can be off-putting to listeners.

Satellite weather warning systems are already a vital and highly beneficial component of the U.S. weather infrastructure, not a separate or future alternative. They are considered the backbone of modern forecasting, providing the majority of the data used in the models that generate all our weather alerts, from smartphone push notifications to NWR broadcasts. Benefits of satellite systems include:

Global and Continuous Coverage: Satellites can monitor vast, remote areas, especially oceans, where ground-based radar and observation stations are sparse. Geostationary satellites provide continuous, real-time views of developing storms over fixed regions (like the Atlantic or Pacific), while polar-orbiting satellites offer high-resolution global observations twice daily.

Improved Forecast Accuracy and Lead Times: Data from satellites are integrated into complex numerical weather prediction models. This data has improved the accuracy of forecasts days in advance. Advanced tools using satellite data have added critical lead time for severe weather warnings, such as 14 minutes of additional lead time for severe thunderstorms and up to an hour for lightning strikes, giving people more time to seek shelter.

Detailed Storm Monitoring: Satellites provide high-resolution imagery and data on cloud properties, atmospheric temperature/moisture, lightning activity, and wind patterns, allowing forecasters to better track the development, intensity, and movement of severe storms like hurricanes and tornadoes.

Post-Disaster Assessment: Satellites continue to be beneficial after a storm passes. They can help identify flood extents and, by comparing nighttime imagery, pinpoint areas with power outages, which assists emergency responders in deploying resources efficiently.

The limitations of the overall warning system are not necessarily due to the satellites themselves, but rather how their data is used and distributed:

Data Gaps and Outages: The U.S. system can face data gaps if certain satellites are decommissioned without immediate replacement, which can degrade forecast accuracy, particularly for hurricane intensity.

Data Interpretation: While satellites provide essential raw data, it requires sophisticated computer modeling and human expertise to interpret and translate into actionable public warnings.

In essence, satellites are an indispensable asset, and the focus of improvements is on enhancing the technology and ensuring seamless data flow to maximize their life-saving potential.

What is needed, therefore, is a reliable satellite-based warning system that does not have significant coverage gaps.

SUMMARY OF THE INVENTION

The above and other needs are met by an emergency warning system that is in communication with a global satellite network comprising a plurality of satellites, wherein each individual satellite of the plurality of satellites is operable to transmit a downlink signal that extends over a downlink signal footprint encompassing a portion of a surface of a planet assigned to the individual satellite. A preferred embodiment of the emergency warning system includes one or more server computers that are operable to execute instructions to:

receive an alert signal originating from an alerting system, wherein the alert signal contains geographic information indicating a geographic location of an emergency situation and description information that describes the emergency situation;

determine the geographic location of the emergency situation based on the geographic information contained in the alert signal;

based on the geographic location of the emergency situation, identify at least one satellite in the global satellite network that has a downlink signal footprint at least partially overlapping the geographic location of the emergency situation; and generate alert information to be uplinked to the identified satellite, wherein the alert information includes the geographic information and the description information.

The emergency warning system also includes a disaster warning device disposed within the downlink signal footprint of the identified satellite. The disaster warning device comprises a satellite receiver, a controller in communication with the satellite receiver, and an audio output transducer in communication with the controller. The satellite receiver operable to receive the alert information downlinked from the identified satellite. The controller is operable to process the alert information received by the satellite receiver to generate an alert message containing at least the description information. The audio output transducer is operable to generate an audible warning based on the alert message.

In some embodiments, the one or more server computers are further operable to generate the alert information to include a first geolocation code corresponding to the geographic location of the emergency situation. The disaster warning device further includes a memory device that stores a second geolocation code corresponding to a geographic location of the disaster warning device. The controller is further operable to access the second geolocation code from the memory device, process the alert information received by the satellite receiver to determine the first geolocation code, determine whether the first geolocation code and the second geolocation code correspond to one and the same geographic location, and activate the audio output transducer to generate the audible warning message if the first geolocation code and the second geolocation code correspond to the same geographic location.

In some embodiments, the controller refrains from activating the audio output transducer to generate the audible warning message if the first geolocation code and the second geolocation code do not correspond to the same geographic location, thereby avoiding generation of a false alarm.

In some embodiments, the disaster warning device includes a user interface that is operable by a user to enter the second geolocation code to be stored in the memory device.

In some embodiments, the disaster warning device also includes a global navigation satellite (GNSS) receiver that is in communication with the controller. The GNSS receiver generates current location information indicating a current geographic location of the disaster warning device. The controller generates the second geolocation code based on the current location information and stores the second geolocation code in the memory device.

In some embodiments, the disaster warning device comprises a cellular phone, a smartphone, or a tablet computer.

In some embodiments, the alerting system is provided by a governmental entity or a nongovernmental entity.

In some embodiments, the emergency warning system is in communication with a wide area network, and the disaster warning device includes a communication interface that is operable to communicate with the wide area network. The one or more server computers are also in communication with the wide area network and are further operable to execute instructions to:

determine whether the alert information can be communicated to the disaster warning device via the wide area network; and based on determining that the alert information can be communicated to the disaster warning device via the wide area network, communicate the alert information to the disaster warning device via the wide area network; or based on determining that the alert information cannot be communicated to the disaster warning device via the wide area network, communicate the alert information to the disaster warning device via the identified satellite.

In some embodiments, the communication interface of the disaster warning device is configured to communicate with the wide area network via Wi-Fi, Bluetooth, ethernet, Short Message Service (SMS), Rick Communication Service (RCS), and/or cellular data (3G, 4G, 5G).

In some embodiments, the disaster warning device includes a user interface having a display device that is operable to visually display the first alert message to a user of the disaster warning device.

In some embodiments, the display device is also operable to visually display a graphic indication that the satellite receiver is in communication with the global satellite network.

In some embodiments, the display device is also operable to visually display a graphic indication of the status of a subscription service for receiving alert messages via the emergency warning system.

In some embodiments, the disaster warning device includes a visual alert light that generates a flashing visual warning when activated by the controller based on the alert message.

In some embodiments, the disaster warning device includes a vibration output that provides an electrical signal to activate a vibrator device to aid in awakening hearing-impaired users.

In some embodiments, the emergency warning system may include other disaster warning devices that are disposed outside the downlink signal footprint of the satellite. These other disaster warning devices are inoperable to receive the alert information downlinked from the identified satellite because they are disposed outside the downlink signal footprint of the identified satellite. Thus, these other disaster warning devices are inoperable to generate audible warning messages based on the downlinked alert information.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
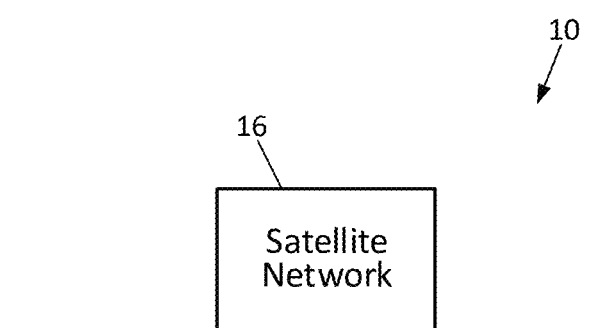
FIG. 1 depicts a system for delivery of disaster warnings via a wide area network according to an embodiment of the invention.
Figure 1:
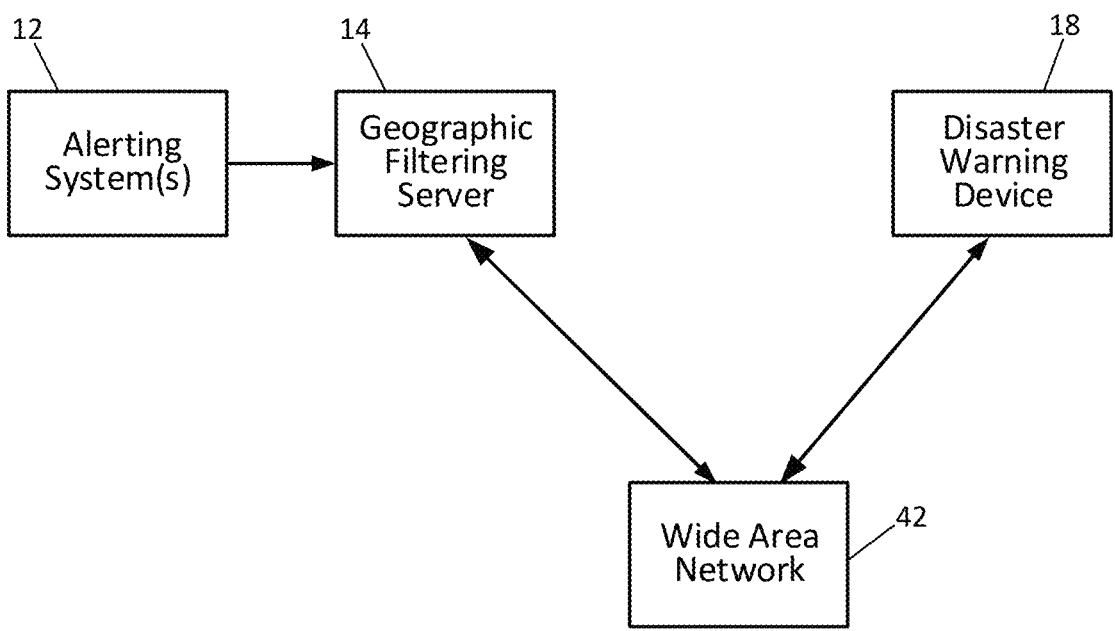

As shown in FIG. 1, embodiments of the invention are directed to a system 10 for the delivery of disaster warning messages via a wide area network 42 to disaster warning devices 18. In a preferred embodiment, the wide area network 42 comprises the Internet. The warning messages may originate from an emergency alert system 12, such as FEMA's IPAWS system 12, which is a national system in the U.S. that acts as a central hub for all hazard alerts. In that system, authorized agencies, such as the National Weather Service (NWS), send alerts to IPAWS, which distributes corresponding alert messages via multiple channels, including the Wireless Emergency Alert (WEA) system, broadcast television and radio, sirens, and highway signs. Similar emergency alert systems are implemented in other countries. Alert messages may also originate from authorized third-party alert systems.

Figure 2:
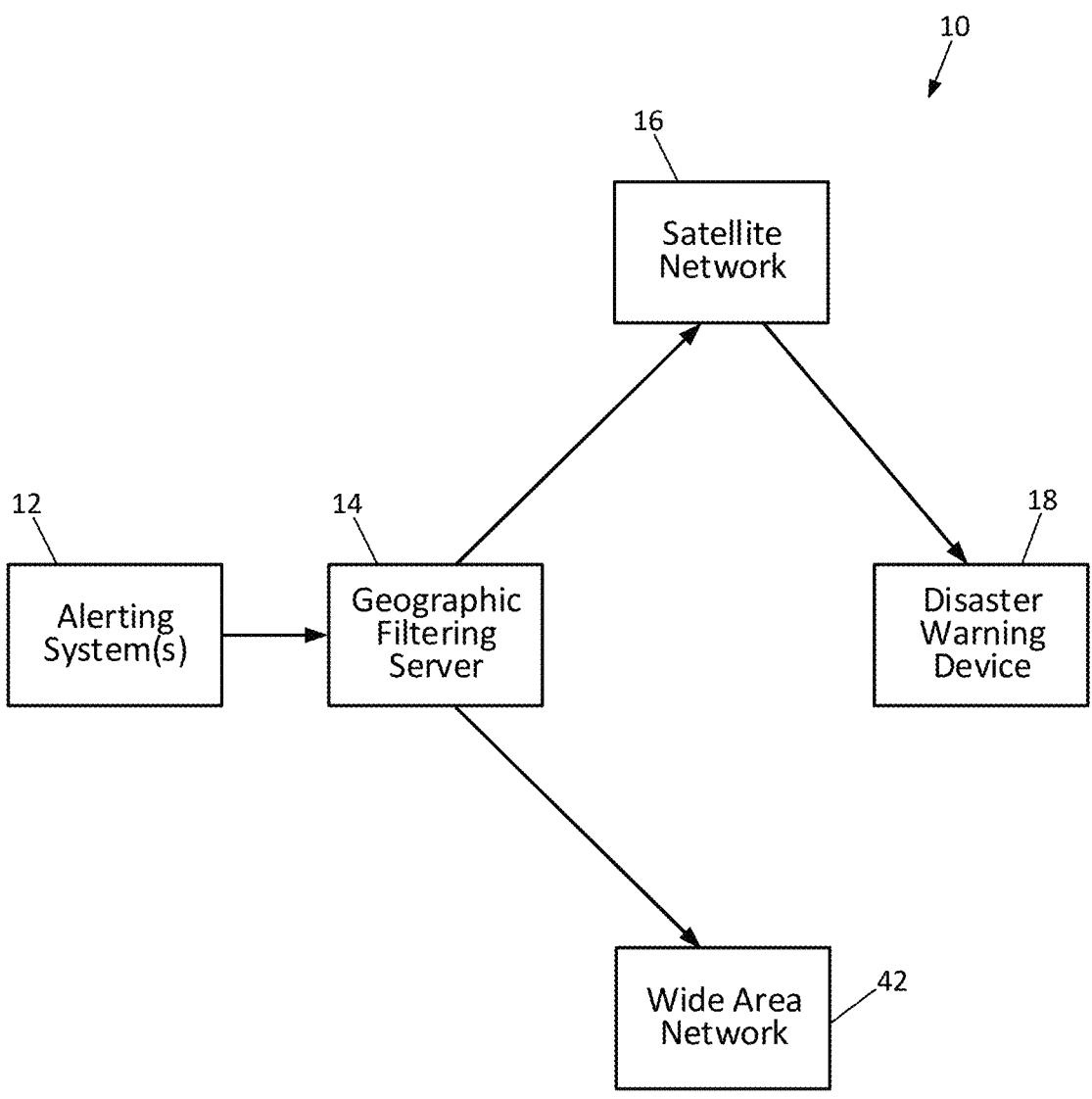
FIG. 2 depicts a system for delivery of disaster warnings via a satellite network according to an embodiment of the invention.

In embodiments of the present invention, the emergency alert system 12 provides alert messages to a geographic filtering server 14 that transmits the alert messages to the wide area network 42. As shown in FIG. 1, if an alert message is directed to a disaster warning device 18 that is connected to the wide area network 42, then the alert message is communicated to the disaster warning device 18 via the wide area network 42. In this case, the disaster warning device 18 returns a receipt confirmation message back to the geographic filtering server 14 via the wide area network 42. However, if an alert message is directed to a disaster warning device 18 that is not connected to the wide area network 42, then no receipt confirmation message will be returned to the geographic filtering server 14. If the geographic filtering server 14 has not received a receipt confirmation message within some predetermined timeout period after sending the alert message, then the geographic filtering server 14 uplinks the alert message to a satellite network 16 through which the alert message is communicated to the disaster warning device 18, as shown in FIG. 2. Thus, the satellite network 16 is considered to be a backup route for sending the alert message to the disaster warning device 18 when the disaster warning device 18 cannot be reached through the wide area network 42.

In one embodiment, the satellite network 16 is the Iridium satellite network, which is a commercial satellite constellation of sixty-six interconnected satellites in low-Earth orbit. The Iridium network is designed to provide voice and data services across the entire globe, including remote and polar regions.

In preferred embodiments, each alert message includes a geolocation code corresponding to the geographic area to which the alert message is directed.

In a preferred embodiment, each alert message uplinked from the geographic filtering server 14 to the satellite network 16 is transmitted in downlink signals only from the one or more individual satellites in the network 16 that have footprints that at least partially cover the geographic area to which the alert message is directed. The geographic filtering server 14 identifies which of the satellite(s) in the network 16 should downlink the alert message based on the geographic area covered by the footprints of the satellites' downlink antenna patterns. As discussed in more detail hereinafter, in some embodiments, the geographic filtering server 14 also appends a geolocation code to the alert message corresponding to the exact geographic area within the satellite's footprint to which the alert message is directed.

Figure 3:
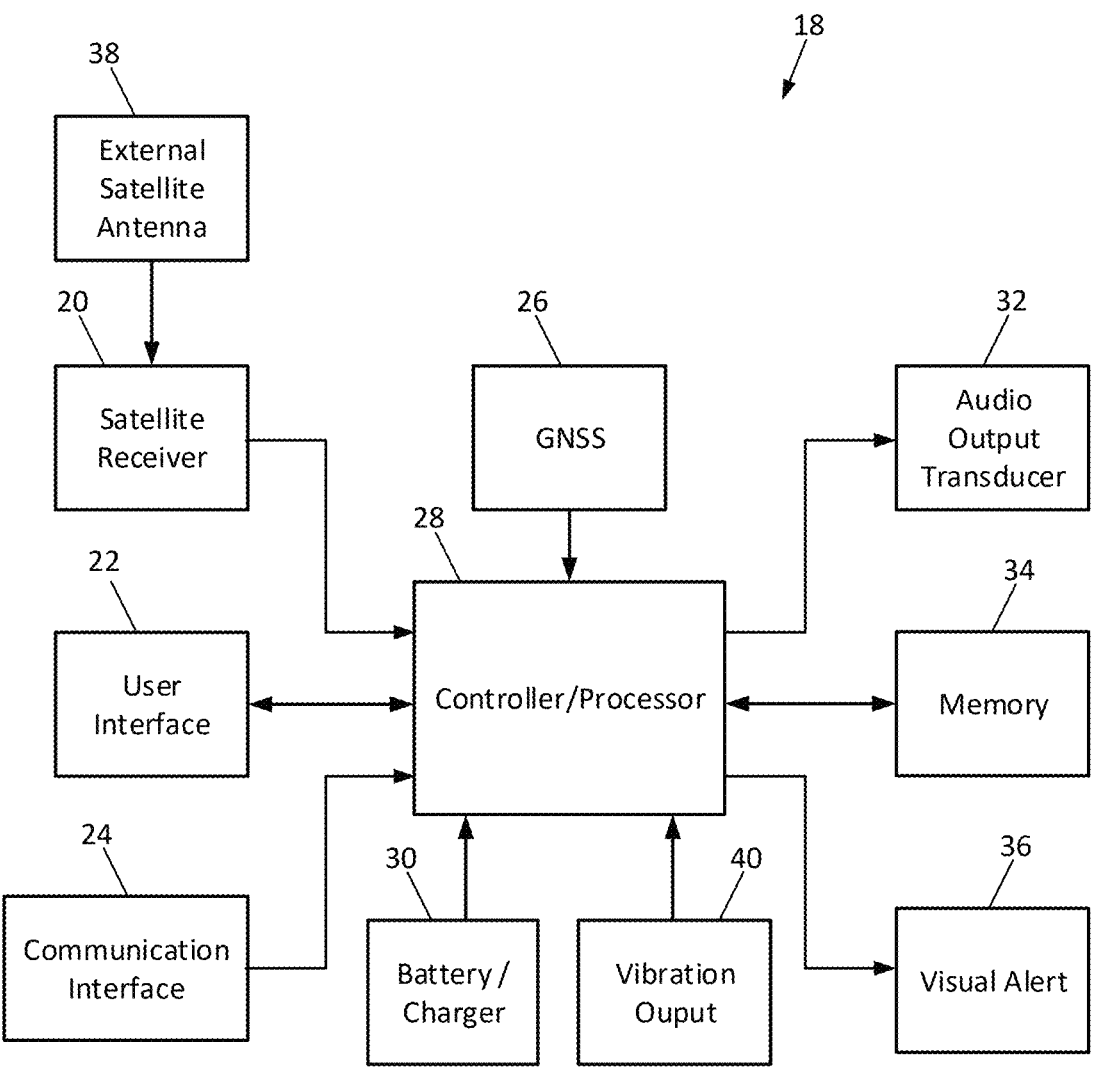
FIG. 3 depicts a disaster warning device according to an embodiment of the invention.

FIG. 3 depicts an embodiment of a disaster warning device 18 according to an embodiment of the present invention. The device 18 includes a satellite receiver (or transceiver) 20 and its associated antenna 38, a global navigation satellite system (GNSS) receiver 26, an audio output transducer 32, a user interface 22, a communication interface 24, memory 34, a visual alert light 36, a power supply 30, and a controller 28. In a preferred embodiment, the power supply 30 comprises a high-density long-life sealed lithium battery that may last for up to ten years. Preferably, once the device 16 is initially powered on—such as by removing a piece of insulation tape from the battery's electrical contacts—it remains powered on until the end of the battery's life. In some embodiments, the battery 30 may be charged via a USB port and/or an inductive charging circuit.

The user interface 22, which may include a small display screen and one or more buttons, allows a user to manually enter a geolocation code corresponding to the geographic location in which the device 16 is to be used. In one preferred embodiment, the geolocation code is a postal code (such as a ZIP code in the U.S.) or another code that is based on a specific street address. The geolocation code may also comprise geographic location coordinates, such as latitude/ longitude coordinates in degrees, minutes, and seconds (DMS) format, degrees and decimal minutes format, or decimal degrees format.

In a preferred embodiment, the display screen of the user interface 22 includes a graphic indicator that indicates the satellite receiver 20 is in communication with the satellite network 16. To support this feature, the individual satellites in the satellite network may periodically (such as weekly or daily) transmit a confirmation signal to all disaster warning devices 18 within their downlink signal footprints. Upon receipt of the confirmation signal by the satellite receiver 20, the controller 28 activates the display device of the user interface 22 to display the graphic indicator to let the user know that the device 18 is in communication with the satellite network 16. The display screen also may include another graphic indicator that indicates the status of a subscription service for the alert messages (active or expired).

In some embodiments, the communication interface 24 is operable to communicate with the wide area network 42 via one or more of Wi-Fi, Bluetooth, ethernet, Short Message Service (SMS), Rick Communication Service (RCS), or cellular data (3G, 4G, 5G).

In some embodiments, the communication interface 24 may communicate with a mobile application running on a nearby smartphone, and the geolocation code or address may be entered using the mobile application. The controller 28 stores the geolocation code in the memory 34. Alternatively, if a GNSS signal is available, the GNSS receiver 26 may provide location coordinates of the current geolocation of the device 18, and the controller 28 generates the geolocation code based on the GNSS coordinates and stores the location code in the memory 34.

In one embodiment, the satellite receiver 20 is an Iridium 9603 short burst data transceiver that is compatible with Iridium's short burst data service. This receiver 20 may have an integrated patch antenna, and it may include an SMA connector for connecting to the external antenna 18.

Alert messages received by the communication interface 24 or by the satellite receiver 20 are provided to the controller 28, which may be a microprocessor that executes logic instructions for controlling various functions of the disaster warning device 18. In a preferred embodiment, each alert message provided to the controller 28 includes the geolocation code corresponding to the geographic location that is subject to the alert. The controller 28 compares the received geolocation code to the geolocation code stored in the memory 34, and if the codes match, the controller 28 activates the audio output transducer 32 to generate an audible alarm. In a preferred embodiment, the audio output transducer 32 is a speaker powered by an audio amplifier having sufficient power to generate an alarm loud enough to awaken a sleeping user. The controller 28 may also activate the visual alert light 36 to flash repetitively. In some embodiments, the warning device 18 includes a vibration output port 40 that provides an electrical signal to an accessory device, such as a bed shaker or pillow vibrator, to aid in awakening hearing-impaired users.

If the geolocation code in the received alert message does not match the geolocation code stored in the memory 34, no audible or visible alarm is generated, thereby avoiding false alarms.

The audio output transducer 32 may also generate voice messages to communicate the nature of the emergency (i.e., flood, tornado, etc.), and it may provide instructions regarding what the recipient of the message should do, or where to go for safety. The voice messages may be preprogrammed messages stored in the memory 34 that the controller 28 retrieves based on one or more codes provided in the alert message from the satellite receiver 20. In some embodiments, the voice messages may also be transmitted via the communication interface 24 from the warning device 18 to the user's smartphone or other mobile communication device.

Because specific location programming is done by each individual user, the warning devices 16 can be mass produced with no need for location programming at the manufacturer. This dramatically reduces costs.

In a preferred embodiment, the location code stored in the memory 34 can be easily reset and reprogrammed by the user in case the warning device 18 is to be used in a different location.

In some embodiments, the location code is automatically reprogrammed if the GNSS receiver 26 detects that the warning device 18 has been moved away from a location for which it was programmed previously. In such embodiments, the GNSS receiver 26 may periodically wake up (such as daily), determine its location, and reprogram the geolocation code if the location has changed.

In some embodiments, the geographic areas covered by the footprints of the downlink antenna patterns of the satellites in the network 16 are small enough that it is not necessary to store geolocation codes in the memory 34 of the warning device 18. In such embodiments, all active warning devices 18 within the downlink footprint of the transmitting satellite will receive and be activated to generate an alert based on an alert message, without filtering based on geolocation codes.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

The invention claimed is:

1. An emergency warning system that is in communication with a global satellite network comprising a plurality of satellites, wherein each individual satellite of the plurality of satellites is operable to transmit a downlink signal that extends over a downlink signal footprint encompassing a portion of a surface of a planet assigned to the individual satellite, the emergency warning system comprising:

one or more server computers operable to execute instructions to:

receive an alert signal originating from an alerting system, wherein the alert signal contains geographic information indicating a geographic location of an emergency situation and description information that describes the emergency situation;

determine the geographic location of the emergency situation based on the geographic information contained in the alert signal;

based on the geographic location of the emergency situation, identify at least one satellite in the global satellite network that has a downlink signal footprint at least partially overlapping the geographic location of the emergency situation; and generate alert information that can be uplinked to the at least one identified satellite, wherein the alert information includes the geographic information and the description information; and a first disaster warning device disposed within the downlink signal footprint of the at least one identified satellite, the first disaster warning device comprising:

a satellite receiver operable to receive the alert information downlinked from the at least one identified satellite;

a controller in communication with the satellite receiver, the controller operable to process the alert information received by the satellite receiver to generate an alert message containing at least the description information; and an audio output transducer in communication with the controller, the audio output transducer operable to generate an audible warning based on the alert message.

2. The emergency warning system of claim 1 wherein:

the one or more server computers are further operable to execute instructions to generate the alert information that includes the geographic information comprising a first geolocation code corresponding to the geographic location of the emergency situation; and the first disaster warning device further comprises:

a memory device that is operable to store a second geolocation code corresponding to a geographic location of the first disaster warning device; and the controller being further operable to:

access the second geolocation code from the memory device;

process the alert information received by the satellite receiver to determine the first geolocation code;

determine whether the first geolocation code and the second geolocation code correspond to one and the same geographic location; and based on determining that the first geolocation code and the second geolocation code correspond to one and the same geographic location, activate the audio output transducer to generate the audible warning message.

3. The emergency warning system of claim 2 wherein the controller is further operable to refrain from activating the audio output transducer to generate the audible warning message based on determining that the first geolocation code and the second geolocation code do not correspond to one and the same geographic location, thereby avoiding generation of a false alarm.

4. The emergency warning system of claim 2 wherein the first disaster warning device further comprises a user interface operable by a user to enter the second geolocation code to be stored in the memory device.

5. The emergency warning system of claim 2 wherein the first disaster warning device further comprises:

a global navigation satellite (GNSS) receiver in communication with the controller, the GNSS receiver operable to generate current location information indicating a current geographic location of the first disaster warning device; and the controller further operable to generate the second geolocation code based on the current location information, and store the second geolocation code in the memory device.

6. The emergency warning system of claim 1 wherein the first disaster warning device comprises a cellular phone, a smartphone, or a tablet computer.

7. The emergency warning system of claim 1 wherein the alerting system is provided by a governmental entity or a nongovernmental entity.

8. The emergency warning system of claim 1 in communication with a wide area network, wherein:

the first disaster warning device further comprises a communication interface that is operable to communicate with the wide area network; and the one or more server computers are in communication with the wide area network and are further operable to execute instructions to:

determine whether the alert information can be communicated to the first disaster warning device via the wide area network; and based on determining that the alert information can be communicated to the first disaster warning device via the wide area network, communicate the alert information to the first disaster warning device via the wide area network; or based on determining that the alert information cannot be communicated to the first disaster warning device via the wide area network, communicate the alert information to the first disaster warning device via the at least one identified satellite.

9. The emergency warning system of claim 8 wherein the communication interface of the first disaster warning device is configured to communicate with the wide area network via one or more of Wi-Fi, Bluetooth, ethernet, Short Message Service (SMS), Rick Communication Service (RCS), and cellular data (3G, 4G, 5G).

10. The emergency warning system of claim 1 wherein the first disaster warning device further comprises a user interface including a display device that is operable to visually display the first alert message to a user of the first disaster warning device.

11. The emergency warning system of claim 1 wherein the first disaster warning device further comprises a user interface including a display device that is operable to visually display a graphic indication that the satellite receiver is in communication with the global satellite network.

12. The emergency warning system of claim 1 wherein the first disaster warning device further comprises a visual alert light in communication with the controller, wherein the visual alert light is operable to generate a flashing visual warning when activated by the controller based on the alert message.

13. The emergency warning system of claim 1 wherein the first disaster warning device further comprises a vibration output in communication with the controller, wherein the vibration output is operable when activated by the controller to provide an electrical signal to activate a vibrator device to aid in awakening hearing-impaired users.

14. The emergency warning system of claim 1 further comprising a second disaster warning device disposed outside the downlink signal footprint of the at least one identified satellite, the second disaster warning device being inoperable to receive the alert information downlinked from the at least one identified satellite due to the second disaster warning device being disposed outside the downlink signal footprint of the at least one identified satellite, and thereby being inoperable to generate an audible warning message based on the alert information.

15. An emergency warning system that is in communication with a global satellite network comprising a plurality of satellites and in communication with a wide area network, wherein each individual satellite of the plurality of satellites is operable to transmit a downlink signal that extends over a downlink signal footprint encompassing a portion of a surface of a planet assigned to the individual satellite, the emergency warning system comprising:

one or more server computers operable to execute instructions to:

receive an alert signal that contains geographic information indicating a geographic location of an emergency situation and description information that describes the emergency situation;

generate alert information that includes the description information and a first geolocation code corresponding to the geographic location of the emergency situation;

determine whether the alert information can be communicated to a disaster warning device via the wide area network; and if the alert information can be communicated to the disaster warning device via the wide area network, communicate the alert information to the disaster warning device via the wide area network; or if the alert information cannot be communicated to the disaster warning device via the wide area network:

determine the geographic location of the emergency situation based on the geographic information contained in the alert signal;

based on the geographic location of the emergency situation, identify at least one satellite in the global satellite network that has a downlink signal footprint at least partially overlapping the geographic location of the emergency situation; and transmit the alert information via the at least one identified satellite; and the disaster warning device comprising:

a satellite receiver operable to receive alert information transmitted from the at least one identified satellite;

a communication interface operable to receive alert information communicated via the wide area network;

a memory device operable to store a second geolocation code corresponding to a geographic location of the disaster warning device;

a controller in communication with the satellite receiver, the communication interface, and the memory device, the controller operable to:

access the second geolocation code from the memory device;

process the alert information, which is received by the satellite receiver or the communication interface, to determine the first geolocation code;

determine whether the first geolocation code and the second geolocation code correspond to one and the same geographic location; and based on determining that the first geolocation code and the second geolocation code correspond to one and the same geographic location, process the alert information to generate an alert message containing at least the description information; and an audio output transducer in communication with the controller, the audio output transducer operable to generate an audible warning based on the alert message.

16. The emergency warning system of claim 15, wherein the disaster warning device further comprises a user interface operable by a user to enter the second geolocation code to be stored in the memory device.

17. The emergency warning system of claim 15 wherein the disaster warning device further comprises:

a global navigation satellite (GNSS) receiver in communication with the controller, the GNSS receiver operable to generate current location information indicating a current geographic location of the disaster warning device; and the controller further operable to generate the second geolocation code based on the current location information, and store the second geolocation code in the memory device.

18. The emergency warning system of claim 15 wherein the disaster warning device comprises a cellular phone, a smartphone, or a tablet computer.

19. The emergency warning system of claim 15 wherein the alerting system is provided by a governmental entity or a nongovernmental entity.

20. The emergency warning system of claim 15 wherein the communication interface of the disaster warning device is operable to communicate with the wide area network via one or more of Wi-Fi, Bluetooth, ethernet, Short Message Service (SMS), Rick Communication Service (RCS), and cellular data (3G, 4G, 5G).

* * * * *